(12) United States Patent
Hung et al.

(10) Patent No.: US 9,164,504 B2
(45) Date of Patent: Oct. 20, 2015

(54) MOLD MACHINING METHOD AND MOLD MACHINING SYSTEM FOR COMPUTER NUMERICAL CONTROL

(71) Applicant: Wistron Corporation, New Taipei (TW)

(72) Inventors: Chun-Yen Hung, New Taipei (TW); Chu-Chia Tsai, New Taipei (TW); Ya-Chi Hsiao, New Taipei (TW)

(73) Assignee: Wistron Corporation, New Taipei (TW)

( * ) Notice: Subject to any disclaimer, the term of this patent is extended or adjusted under 35 U.S.C. 154(b) by 399 days.

(21) Appl. No.: 13/654,439

(22) Filed: Oct. 18, 2012

(65) Prior Publication Data

US 2014/0018952 A1    Jan. 16, 2014

(30) Foreign Application Priority Data

Jul. 16, 2012   (TW) .............................. 101125531 A (51) Int. Cl.

| | |
|---|---|
| *G05B 19/18* | (2006.01) |
| *G06F 19/00* | (2011.01) |
| *B29C 39/00* | (2006.01) |
| *B05C 11/00* | (2006.01) |
| *B05C 13/00* | (2006.01) |
| *B05C 13/02* | (2006.01) |
| *G06F 17/50* | (2006.01) |
| *G05B 19/4097* | (2006.01) |

(52) U.S. Cl.
CPC .................................. *G05B 19/4097* (2013.01)

(58) Field of Classification Search
CPC ...... G05B 19/40; G05B 2219/00; B44B 3/00; G06F 19/00; B05C 5/02; B05B 13/04

USPC ......... 700/2, 95, 98, 119, 159, 160, 193, 197; 118/66, 67; 703/1
See application file for complete search history.

(56) References Cited

U.S. PATENT DOCUMENTS

| | | | |
|---|---|---|---|
| 6,701,200 B1 * | 3/2004 | Lukis et al. ..................... | 700/98 |
| 2003/0187624 A1 * | 10/2003 | Balic ................................ | 703/1 |
| 2004/0128016 A1 * | 7/2004 | Stewart ......................... | 700/159 |
| 2005/0015223 A1 | 1/2005 | Huang | |
| 2006/0200269 A1 * | 9/2006 | Saarela et al. ................ | 700/193 |

FOREIGN PATENT DOCUMENTS

CN          102156441 A     8/2011

OTHER PUBLICATIONS

Office action mailed on Jun. 3, 2015 for the China application No. 201210262048.0, p. 3 line 5-40, p. 4-5 and p. 6 line 1-12.

* cited by examiner

*Primary Examiner* — Mohammad Ali
*Assistant Examiner* — Md Azad
(74) *Attorney, Agent, or Firm* — Winston Hsu; Scott Margo (57) ABSTRACT

A mold machining method for computer numerical control includes steps of establishing a 3D pattern; performing an initial machining process on a mold material by the 3D pattern; calculating a total machining area corresponding to the 3D pattern; dividing the 3D pattern into a plurality of precise machining regions according to the total machining area and a predetermined machining area and enabling a boundary line between every two adjacent precise machining regions to be corresponding to a crest line of the 3D pattern; and performing a precise machining process on each of the precise machining regions and changing a cutting tool at the boundary line between every two adjacent precise machining regions.

8 Claims, 9 Drawing Sheets

MOLD MACHINING METHOD AND MOLD MACHINING SYSTEM FOR COMPUTER NUMERICAL CONTROL

BACKGROUND OF THE INVENTION

1. Field of the Invention

The disclosure relates to a mold machining method and a mold machining system and, more particularly, to a mold machining method and a mold machining system for computer numerical control.

2. Description of the Prior Art

In general, a computer numerical control (CNC) system can be used to form a 3D pattern on a plastic injection mold. In the CNC system, numerical control (NC) instructions are inputted into a memory of a numerical control system and compiled by the computer and then a 2D or 3D file is transmitted to a driver for driving a motor to cut a surface of a mold, so as to form a 3D pattern with different depths and curved surfaces on the surface of the mold.

Figure 1:
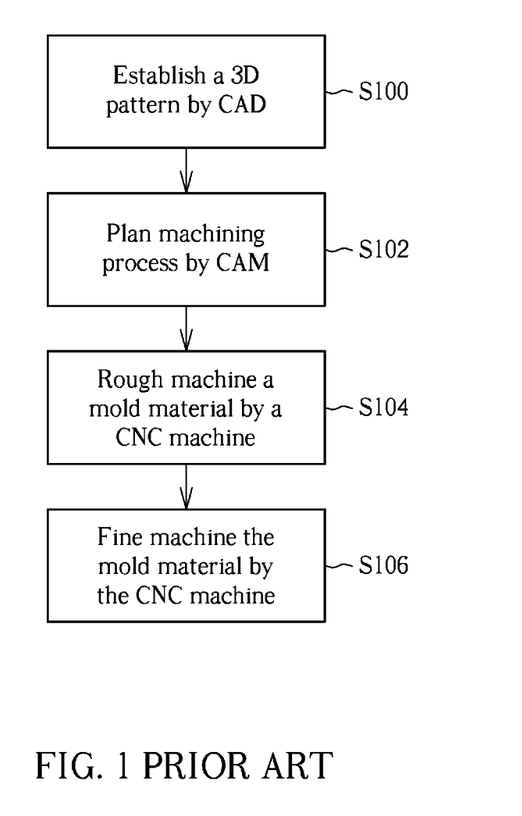
FIG. 1 is a flowchart illustrating a CNC machining process of the prior art.

Referring to FIG. 1, FIG. 1 is a flowchart illustrating a CNC machining process of the prior art. As shown in FIG. 1, the conventional CNC machining process performs step S100 first to establish a 3D pattern by computer aided design (CAD) software. Afterward, step S102 is performed to plan machining process by computer aided manufacturing (CAM) software. Step S104 is then performed to rough machine a mold material by a CNC machine. Finally, step S106 is performed to fine machine the mold material by the CNC machine. However, the conventional CNC machining process always has the following problems.

1) If only one cutting tool is used to machine a mold with a 3D pattern larger than 10000 $mm^2$, there will be obvious cutting marks formed on the mold due to worn cutting tool such that the appearance of a product made by the mold will not have uniform gloss;

2) After changing the worn cutting tool by a new cutting tool, the appearance of a product made by the mold will have obvious tool marks and will not have uniform gloss;

3) After machining the mold, the mold has to be polished manually due to uneven surface without high gloss such that crest lines of the 3D pattern may deform and refraction angles may be disordered; and 4) After machining the mold, the mold has to be sprayed with paint or sand so as to modify tool marks such that the labor hour and cost will increase due to secondary processing and the appearance of a product made by the mold will not have high gloss.

SUMMARY OF THE INVENTION

The disclosure provides a mold machining method and a mold machining system for computer numerical control so as to solve the aforesaid problems.

According to an embodiment of the disclosure, a mold machining method for computer numerical control comprises steps of establishing a 3D pattern; performing an initial machining process on a mold material by the 3D pattern; calculating a total machining area corresponding to the 3D pattern; dividing the 3D pattern into a plurality of precise machining regions according to the total machining area and a predetermined machining area and enabling a boundary line between every two adjacent precise machining regions to be corresponding to a crest line of the 3D pattern; and performing a precise machining process on each of the precise machining regions and changing a cutting tool at the boundary line between every two adjacent precise machining regions.

In this embodiment, cutting directions of two adjacent precise machining regions are opposite to each other.

In this embodiment, the cutting tool is fed or retracted at the boundary line between every two adjacent precise machining regions.

In this embodiment, the boundary line between every two adjacent precise machining regions is corresponding to a highest line of the 3D pattern.

According to another embodiment of the disclosure, a mold machining system for computer numerical control comprises a pattern establishing module, a calculating module, a region dividing module and a machining module. The pattern establishing module is used for establishing a 3D pattern. The calculating module is used for calculating a total machining area corresponding to the 3D pattern. The region dividing module is used for dividing the 3D pattern into a plurality of precise machining regions according to the total machining area and a predetermined machining area and enabling a boundary line between every two adjacent precise machining regions to be corresponding to a crest line of the 3D pattern. The machining module is used for performing an initial machining process on a mold material by the 3D pattern after the 3D pattern is established and performing a precise machining process on each of the precise machining regions after the precise machining regions are obtained, wherein the machining module changes a cutting tool at the boundary line between every two adjacent precise machining regions.

In this embodiment, cutting directions of two adjacent precise machining regions are opposite to each other.

In this embodiment, the cutting tool is fed or retracted at the boundary line between every two adjacent precise machining regions.

In this embodiment, the boundary line between every two adjacent precise machining regions is corresponding to a highest line of the 3D pattern.

According to another embodiment of the disclosure, a mold machining method for computer numerical control comprises steps of establishing a 3D pattern; performing an initial machining process on a mold material by the 3D pattern; and feeding a cutting tool at a position corresponding to a crest line of the 3D pattern so as to perform a precise machining process on the mold material.

As mentioned in the above, the disclosure divides the 3D pattern into a plurality of precise machining regions according to the total machining area and the predetermined machining area and enables the boundary line between every two adjacent precise machining regions to be corresponding to the crest line of the 3D pattern. After performing the precise machining process on each of the precise machining regions, the disclosure changes the cutting tool at the boundary line between every two adjacent precise machining regions. Since the boundary line between every two adjacent precise machining regions is corresponding to the crest line of the 3D pattern (i.e. the highest line of the 3D pattern), the position where the cutting tool is changed is corresponding to a lowest position of a pattern formed on a surface of a product such that tool marks will not be seen by a user due to scatteration of light. Furthermore, since the cutting tool is fed or retracted at the boundary line between every two adjacent precise machining regions (i.e. the cutting tool is fed or retracted at the same position between every two adjacent precise machining regions), tool marks formed by worn cutting tool are unobvious. If the total machining area is smaller than the predetermined machining area, the disclosure may feed the cutting tool at the position corresponding to the crest line of the 3D pattern so as to perform the precise machining process on the mold material immediately without defining the aforesaid precise machining regions. Accordingly, the appearance of a product made by the mold, which is machined by the disclosure, will have no tool marks and have high gloss so as to render the design of the 3D pattern authentically. Moreover, the disclosure does not need polishing process and can reduce labor hour so as to enhance economic benefits.

These and other objectives of the present disclosure will no doubt become obvious to those of ordinary skill in the art after reading the following detailed description of the preferred embodiment that is illustrated in the various figures and drawings.

DETAILED DESCRIPTION

Figure 2:
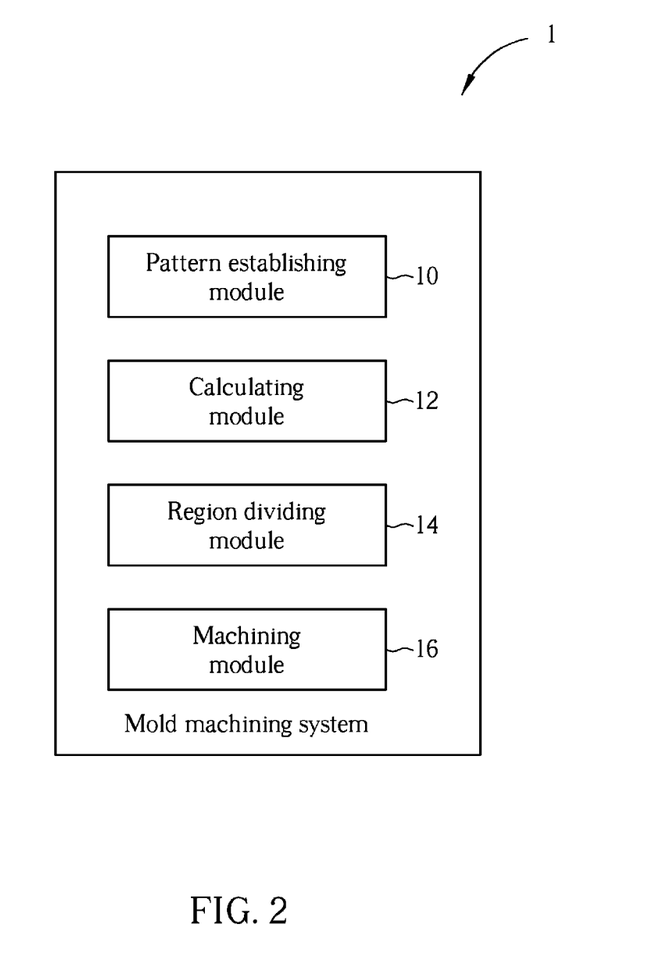
FIG. 2 is a functional block diagram illustrating a mold machining system for computer numerical control according to an embodiment of the disclosure.
Figure 3:
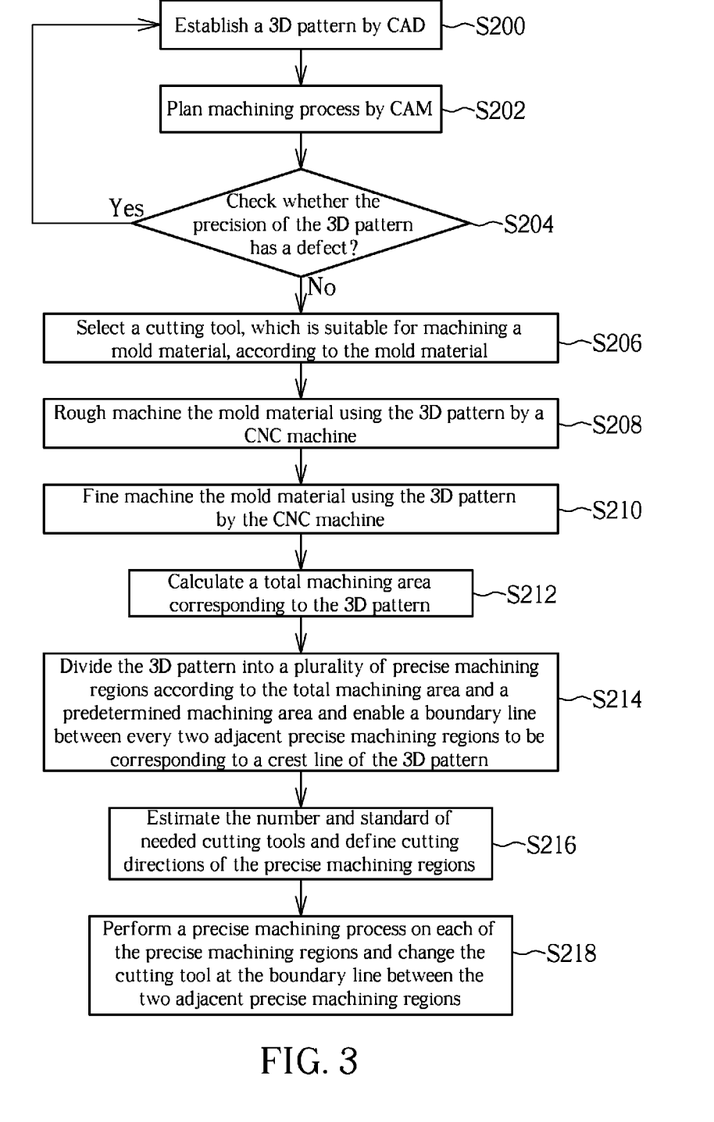
FIG. 3 is a flowchart illustrating a mold machining method for computer numerical control according to an embodiment of the disclosure.
Figure 4:
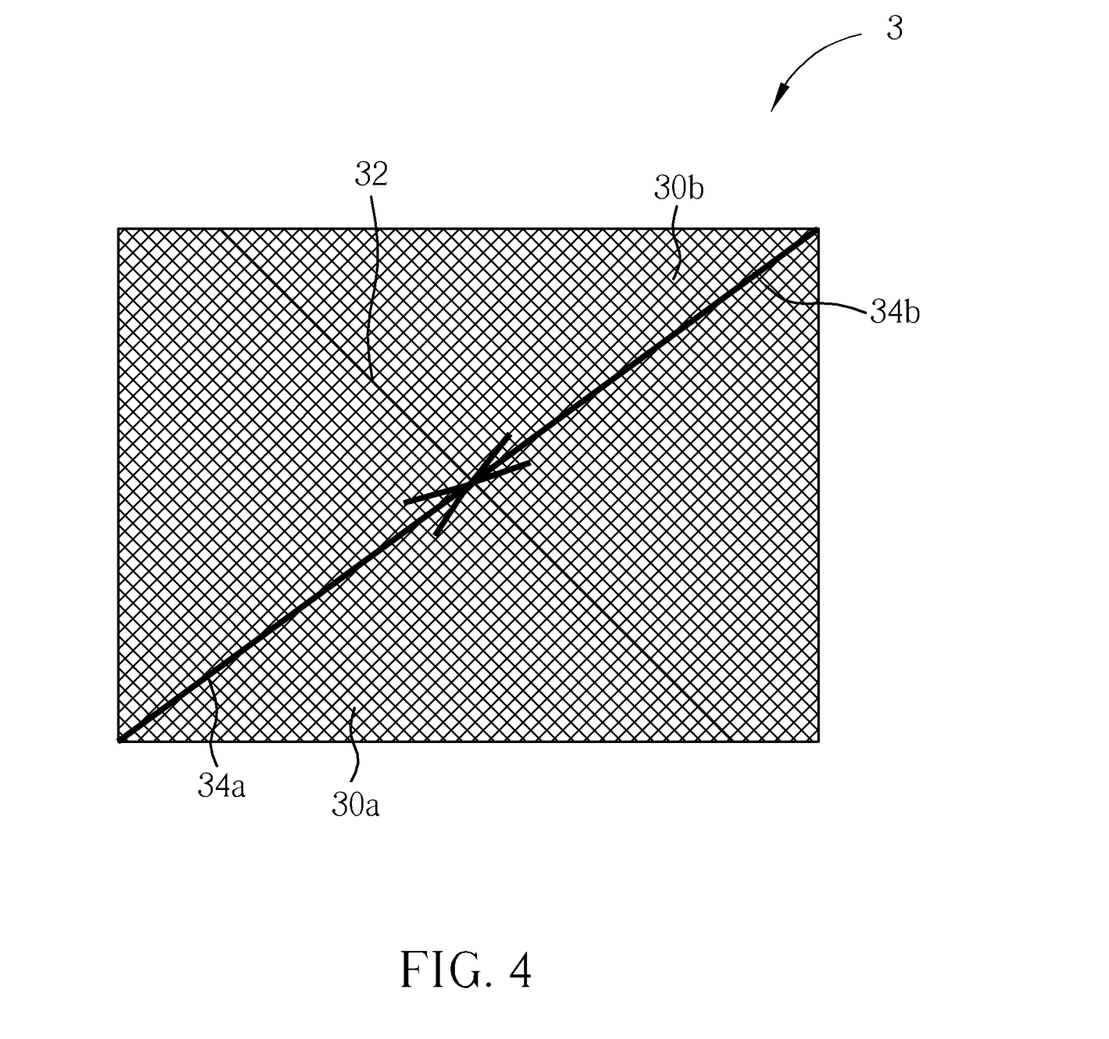
FIG. 4 is a schematic diagram illustrating a 3D pattern.

Referring to FIGS. 2 to 4, FIG. 2 is a functional block diagram illustrating a mold machining system 1 for computer numerical control according to an embodiment of the disclosure, FIG. 3 is a flowchart illustrating a mold machining method for computer numerical control according to an embodiment of the disclosure, and FIG. 4 is a schematic diagram illustrating a 3D pattern 3. The mold machining method shown in FIG. 3 can be implemented by the mold machining system 1 shown in FIG. 2. In practical applications, the mold machining system 1 shown in FIG. 2 and the mold machining method shown in FIG. 3 can be embedded in a computer numerical control (CNC) machine.

As shown in FIG. 2, the mold machining system 1 comprises a pattern establishing module 10, a calculating module 12, a region dividing module 14 and a machining module 16. In this embodiment, the pattern establishing module 10, the calculating module 12, the region dividing module 14 and the machining module 16 may be implemented by software, hardware or the combination thereof.

When the mold machining system 1 shown in FIG. 2 and the mold machining method shown in FIG. 3 are used to machine a mold, first of all, step S200 is performed to establish a 3D pattern 3 (as shown in FIG. 4) by the pattern establishing module 10. In practical applications, the pattern establishing module 10 may use computer aided design (CAD) software to establish the 3D pattern 3. Afterward, step S202 is performed to plan machining process using computer aided manufacturing (CAM) software by the pattern establishing module 10. Step S204 is then performed to check whether the precision of the 3D pattern 3 has a defect by the pattern establishing module 10. If the precision of the 3D pattern 3 has a defect (e.g. lines cross each other), step S200 is performed again to reestablish the 3D pattern 3. If the precision of the 3D pattern 3 has no defect, step S206 is then performed to select a cutting tool, which is suitable for machining a mold material, according to the mold material by the machining module 16. For example, if the mold material is steel, the cutting tool may be tungsten steel cutting tool correspondingly. In this embodiment, the machining module 16 performs an initial machining process on a mold material by the 3D pattern 3 after the 3D pattern 3 is established. The aforesaid initial machining process may comprise steps S208 and S210 shown in FIG. 3, wherein step S208 is performed to rough machine the mold material using the 3D pattern 3 by a CNC machine and step S210 is performed to fine machine the mold material using the 3D pattern 3 by the CNC machine.

Then, step S212 is performed to calculate a total machining area corresponding to the 3D pattern 3 by the calculating module 12. Then, step S214 is performed to divide the 3D pattern 3 into a plurality of precise machining regions according to the total machining area and a predetermined machining area and enable a boundary line between every two adjacent precise machining regions to be corresponding to a crest line of the 3D pattern 3 by the region dividing module 14. For example, if the total machining area is 20000 mm$^2$ and the predetermined machining area is 10000 mm$^2$, the region dividing module 14 will divide the 3D pattern 3 into two precise machining regions 30$a$, 30$b$ (as shown in FIG. 3) and the boundary line 32 between the two adjacent precise machining regions 30$a$, 30$b$ is corresponding to a crest line of the 3D pattern 3. In this embodiment, the boundary line 32 between the two adjacent precise machining regions 30$a$, 30$b$ is corresponding to a highest line of the 3D pattern 3. Furthermore, an orientation of the boundary line 32 between the two adjacent precise machining regions 30$a$, 30$b$ is 45 degrees, as shown in FIG. 4.

After defining the precise machining regions 30$a$, 30$b$, step S216 is performed to estimate the number and standard of needed cutting tools and define cutting directions 34$a$, 34$b$ of the precise machining regions 30$a$, 30$b$ by the machining module 16. In this embodiment, the cutting directions 34$a$, 34$b$ of the two adjacent precise machining regions 30$a$, 30$b$ are opposite to each other and the cutting tool is fed or retracted at the boundary line 32 between the two adjacent precise machining regions 30$a$, 30$b$.

Then, step S218 is performed to perform a precise machining process on each of the precise machining regions 30$a$, 30$b$ and change the cutting tool at the boundary line 32 between the two adjacent precise machining regions 30$a$, 30$b$ by the machining module 16. For example, the machining module 16 may perform the precise machining process on the precise machining region 30$a$ along the cutting direction 34$a$ first. After machining the precise machining region 30$a$, the machining module 16 retracts the cutting tool at the boundary line 32 so as to change the cutting tool. Afterward, the machining module 16 performs the precise machining process on the precise machining region 30$b$ along the cutting direction 34$b$. After machining the precise machining region 30$b$, the machining module 16 also retracts the cutting tool at the boundary line 32. It should be noted that the machining module 16 may also feed the cutting tool at the boundary line 32 and perform the precise machining process on the precise machining regions 30$a$, 30$b$ along reverse directions of the cutting directions 34$a$, 34$b$.

Since the boundary line 32 between the two adjacent precise machining regions 30a, 30b is corresponding to the crest line of the 3D pattern 3 (i.e. the highest line of the 3D pattern 3), the position where the cutting tool is changed is corresponding to a lowest position of a pattern formed on a surface of a product such that tool marks will not be seen by a user due to scatteration of light. Furthermore, since the cutting tool is fed or retracted at the boundary line 32 between the two adjacent precise machining regions 30a, 30b (i.e. the cutting tool is fed or retracted at the same position between every two adjacent precise machining regions), tool marks formed by worn cutting tool are unobvious. Moreover, the disclosure may obtain better surface effect when the orientation of the boundary line 32 is 45 degrees as shown in FIG. 4.

Figure 5:
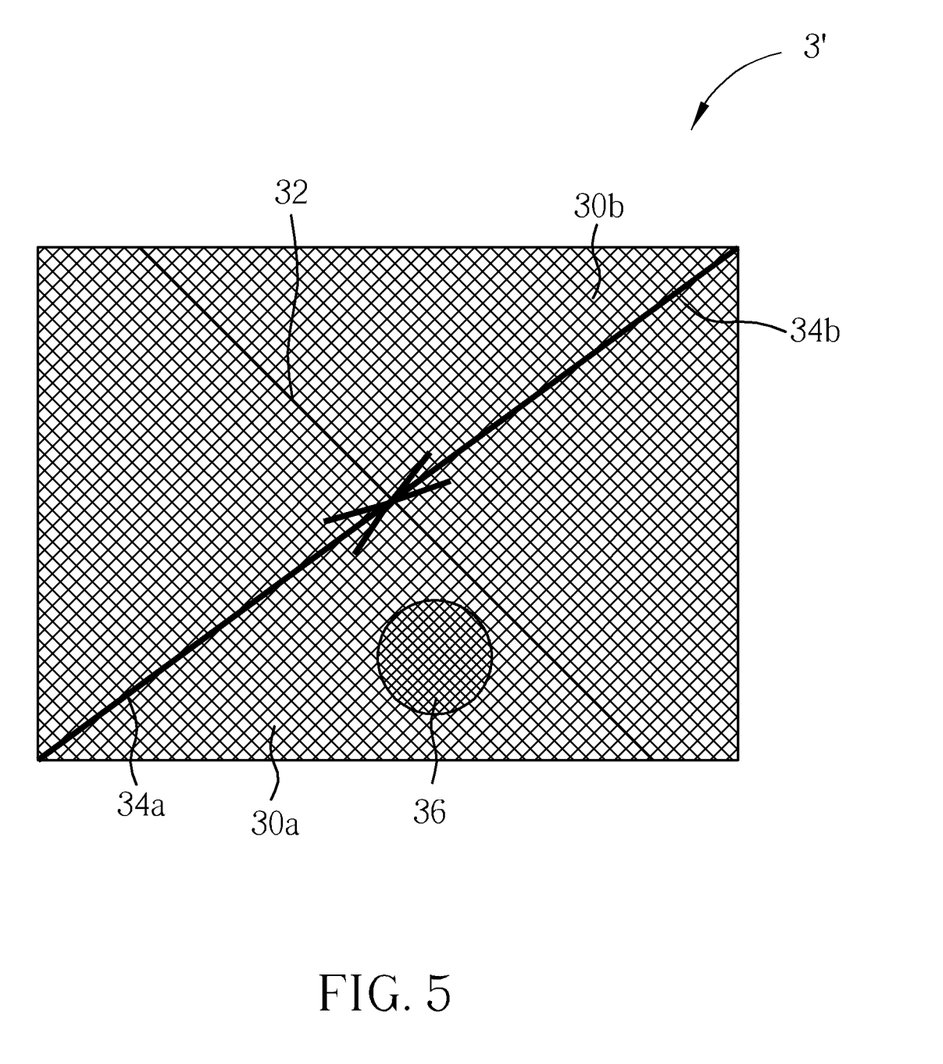
FIG. 5 is a schematic diagram illustrating another 3D pattern.

Referring to FIG. 5, FIG. 5 is a schematic diagram illustrating another 3D pattern 3'. The main difference between the 3D pattern 3' and the aforesaid 3D pattern 3 is that there is a characteristic pattern 36 in the 3D pattern 3'. If there is a characteristic pattern 36 in the 3D pattern 3', the region dividing module 14 will take the characteristic pattern 36 to be an individual precise machining region. In this embodiment, the characteristic pattern 36 may be a pattern consisting of a plurality of complicated lines. It should be noted that the process of using the 3D pattern 3' to machine a mold material is substantially the same as the aforesaid process and it will not be depicted herein again.

Figure 6:
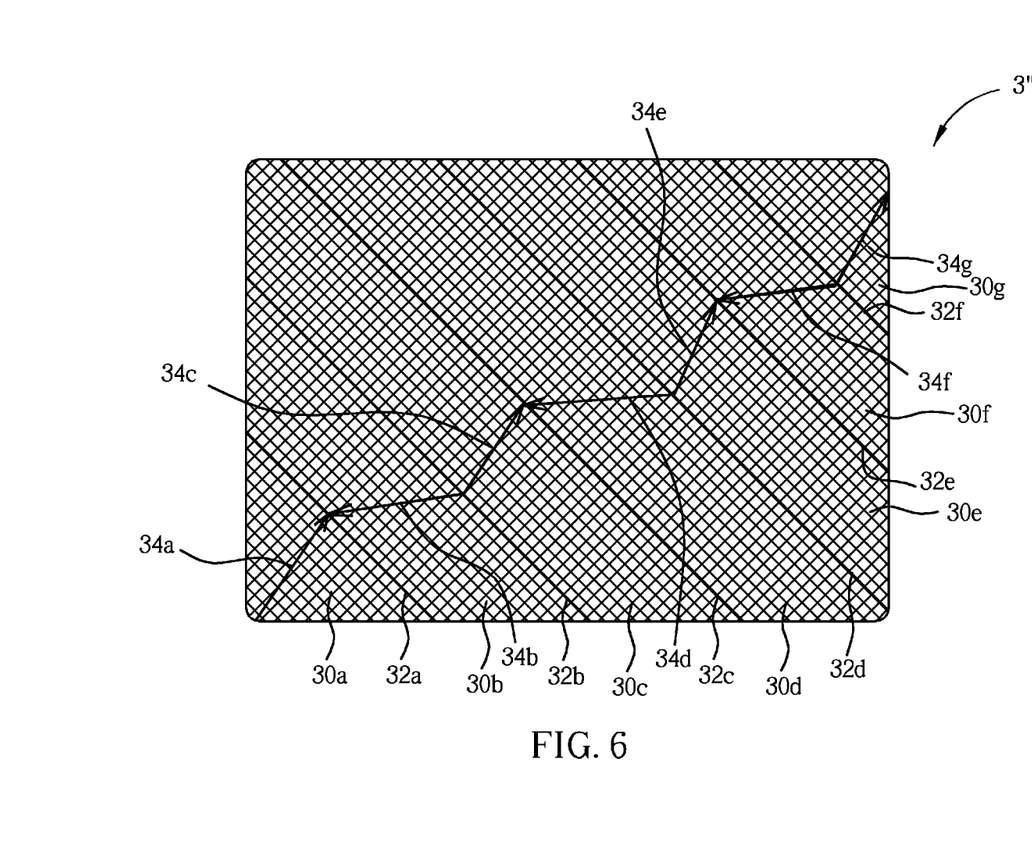
FIG. 6 is a schematic diagram illustrating another 3D pattern.

Referring to FIG. 6, FIG. 6 is a schematic diagram illustrating another 3D pattern 3". The main difference between the 3D pattern 3" and the aforesaid 3D pattern 3 is that the 3D pattern 3" is divided into seven precise machining regions 30a-30g. As shown in FIG. 6, cutting directions 34a-34g of every two adjacent precise machining regions 30a-30g are opposite to each other. Furthermore, the cutting tool is fed or retracted at the boundary lines 32a-32f between every two adjacent precise machining regions 30a-30g (e.g. the cutting tool is fed or retracted at the boundary line 32a between the two adjacent precise machining regions 30a, 30b; the cutting tool is fed or retracted at the boundary line 32b between the two adjacent precise machining regions 30b, 30c; and so on). Moreover, the machining module 16 changes the cutting tool at the boundary lines 32a-32f between every two adjacent precise machining regions 30a-30g. It should be noted that the process of using the 3D pattern 3" to machine a mold material is substantially the same as the aforesaid process and it will not be depicted herein again.

Figure 7:
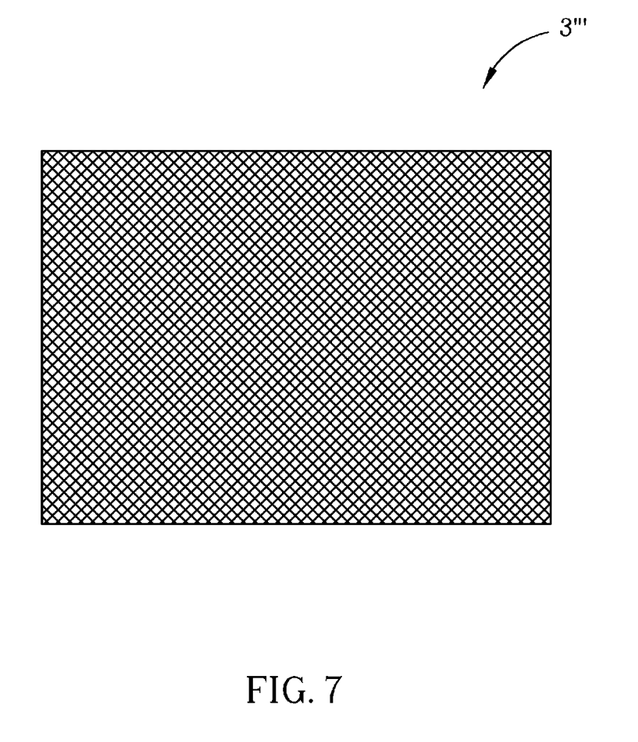
FIG. 7 is a schematic diagram illustrating another 3D pattern.

Referring to FIG. 7, FIG. 7 is a schematic diagram illustrating another 3D pattern 3'''. The main difference between the 3D pattern 3''' and the aforesaid 3D pattern 3 is that the 3D pattern 3''' does not be divided into a plurality of precise machining regions. If the total machining area (e.g. 5000 mm$^2$) is smaller than the predetermined machining area (e.g. 10000 mm$^2$), the disclosure can feed a cutting tool at a position corresponding to a crest line of the 3D pattern 3''' so as to perform a precise machining process on the mold material immediately without defining the aforesaid precise machining regions. In other words, the whole of the 3D pattern 3''' is taken as one single precise machining region. It should be noted that the process of using the 3D pattern 3''' to machine a mold material is substantially the same as the aforesaid process and it will not be depicted herein again.

Figure 8:
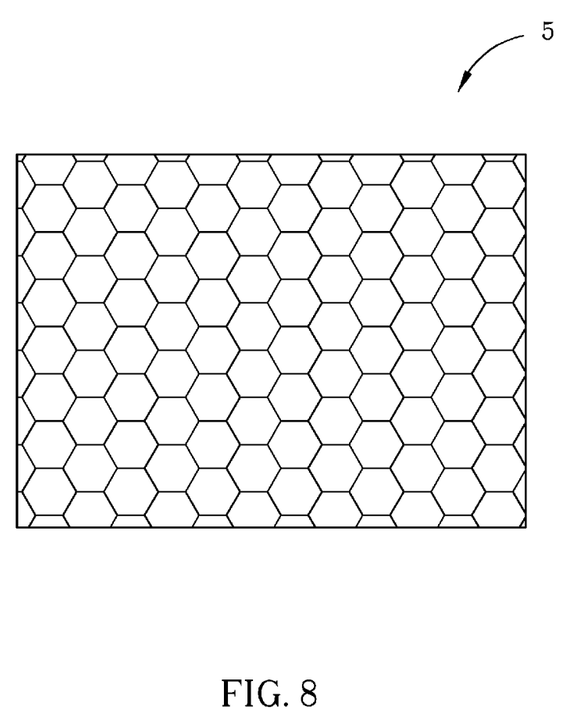
FIG. 8 is a schematic diagram illustrating a mold manufactured by the mold machining method of the disclosure.
Figure 9:
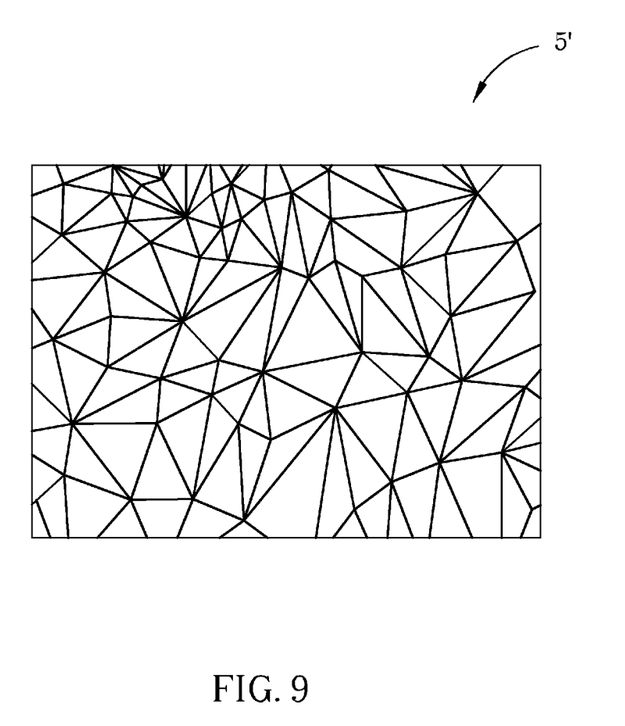
FIG. 9 is a schematic diagram illustrating another mold manufactured by the mold machining method of the disclosure.

Referring to FIGS. 8 and 9, FIG. 8 is a schematic diagram illustrating a mold 5 manufactured by the mold machining method of the disclosure, and FIG. 9 is a schematic diagram illustrating another mold 5' manufactured by the mold machining method of the disclosure. As shown in FIG. 8, a 3D pattern formed on a surface of the mold 5 is regular. As shown in FIG. 9, a 3D pattern formed on a surface of the mold 5' is irregular. In other words, the mold machining method and the mold machining system 1 of the disclosure can form any types of 3D patterns on a mold.

As mentioned in the above, the disclosure divides the 3D pattern into a plurality of precise machining regions according to the total machining area and the predetermined machining area and enables the boundary line between every two adjacent precise machining regions to be corresponding to the crest line of the 3D pattern. After performing the precise machining process on each of the precise machining regions, the disclosure changes the cutting tool at the boundary line between every two adjacent precise machining regions. Since the boundary line between every two adjacent precise machining regions is corresponding to the crest line of the 3D pattern (i.e. the highest line of the 3D pattern), the position where the cutting tool is changed is corresponding to a lowest position of a pattern formed on a surface of a product such that tool marks will not be seen by a user due to scatteration of light. Furthermore, since the cutting tool is fed or retracted at the boundary line between every two adjacent precise machining regions (i.e. the cutting tool is fed or retracted at the same position between every two adjacent precise machining regions), tool marks formed by worn cutting tool are unobvious. If the total machining area is smaller than the predetermined machining area, the disclosure may feed the cutting tool at the position corresponding to the crest line of the 3D pattern so as to perform the precise machining process on the mold material immediately without defining the aforesaid precise machining regions. Accordingly, the appearance of a product made by the mold, which is machined by the disclosure, will have no tool marks and have high gloss so as to render the design of the 3D pattern authentically. Moreover, the disclosure does not need polishing process and can reduce labor hour so as to enhance economic benefits.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A mold machining method for computer numerical control comprising:
    establishing a 3D pattern;
    performing an initial machining process on a mold material by the 3D pattern;
    calculating a total machining area corresponding to the 3D pattern;
    dividing the 3D pattern into a plurality of precise machining regions according to the total machining area and a predetermined machining area and enabling a boundary line between every two adjacent precise machining regions to be corresponding to a crest line of the 3D pattern; and
    performing a precise machining process on each of the precise machining regions and changing a cutting tool at the boundary line between every two adjacent precise machining regions;
    wherein cutting directions of two adjacent precise machining regions are opposite to each other, an orientation of the boundary line between every two adjacent precise machining regions is 45 degrees, and the boundary line between every two adjacent precise machining regions is corresponding to a highest line of the 3D pattern.

2. The mold machining method for computer numerical control of claim 1, wherein the cutting tool is fed or retracted at the boundary line between every two adjacent precise machining regions.

3. The mold machining method for computer numerical control of claim 1, further comprising:
selecting the cutting tool, which is suitable for machining the mold material, according to the mold material.

4. The mold machining method for computer numerical control of claim 1, further comprising:
if there is a characteristic pattern in the 3D pattern, taking the characteristic pattern to be an individual precise machining region.

5. A mold machining system for computer numerical control comprising:
a pattern establishing module for establishing a 3D pattern;
a calculating module for calculating a total machining area corresponding to the 3D pattern;
a region dividing module for dividing the 3D pattern into a plurality of precise machining regions according to the total machining area and a predetermined machining area and enabling a boundary line between every two adjacent precise machining regions to be corresponding to a crest line of the 3D pattern; and
a machining module for performing an initial machining process on a mold material by the 3D pattern after the 3D pattern is established and performing a precise machining process on each of the precise machining regions after the precise machining regions are obtained, wherein the machining module changes a cutting tool at the boundary line between every two adjacent precise machining regions;
wherein cutting directions of two adjacent precise machining regions are opposite to each other, an orientation of the boundary line between every two adjacent precise machining regions is 45 degrees, and the boundary line between every two adjacent precise machining regions is corresponding to a highest line of the 3D pattern.

6. The mold machining system for computer numerical control of claim 5, wherein the cutting tool is fed or retracted at the boundary line between every two adjacent precise machining regions.

7. The mold machining system for computer numerical control of claim 5, wherein the machining module selects the cutting tool, which is suitable for machining the mold material, according to the mold material.

8. The mold machining system for computer numerical control of claim 5, wherein if there is a characteristic pattern in the 3D pattern, the region dividing module takes the characteristic pattern to be an individual precise machining region.

* * * * *